United States Patent
Lee et al.

(10) Patent No.: US 10,140,415 B2
(45) Date of Patent: Nov. 27, 2018

(54) METHOD AND SYSTEM FOR VERIFYING LAYOUT OF INTEGRATED CIRCUIT INCLUDING VERTICAL MEMORY CELLS

(71) Applicant: Samsung Electronics Co., Ltd., Suwon-si (KR)

(72) Inventors: Jae-eun Lee, Hwaseong-si (KR); Sung-hoon Kim, Seongnam-si (KR); Jae-ick Son, Hwaseong-si (KR); Hyang-ja Yang, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/407,535

(22) Filed: Jan. 17, 2017

(65) Prior Publication Data
US 2017/0255742 A1 Sep. 7, 2017

(30) Foreign Application Priority Data
Mar. 4, 2016 (KR) .................. 10-2016-0026424

(51) Int. Cl.
*G06F 17/50* (2006.01)
*G11C 16/04* (2006.01)
*H01L 27/115* (2017.01)

(52) U.S. Cl.
CPC ...... *G06F 17/5081* (2013.01); *G11C 16/0483* (2013.01); *H01L 27/115* (2013.01); *G06F 2217/06* (2013.01)

(58) Field of Classification Search
USPC ........................................... 716/112
See application file for complete search history.

(56) References Cited

U.S. PATENT DOCUMENTS

| | | | |
|---|---|---|---|
| 8,356,271 B2 | 1/2013 | Kim et al. | |
| 8,631,382 B2 | 1/2014 | Wang et al. | |
| 8,789,002 B2 | 7/2014 | Tanaka | |
| 8,935,146 B2 | 1/2015 | Arimoto et al. | |
| 9,026,975 B2 | 5/2015 | Song et al. | |
| 9,053,288 B1 | 6/2015 | Hsieh et al. | |
| 9,087,173 B2 | 7/2015 | Tsai et al. | |
| 2009/0261386 A1* | 10/2009 | Makino | H01L 27/0207 257/210 |
| 2014/0258952 A1 | 9/2014 | Yang et al. | |
| 2014/0282319 A1* | 9/2014 | Xu | G06F 17/5036 716/108 |
| 2015/0269303 A1 | 9/2015 | Tsai et al. | |

FOREIGN PATENT DOCUMENTS

KR 10-1004663 1/2011

* cited by examiner

*Primary Examiner* — Bryce M Aisaka
(74) *Attorney, Agent, or Firm* — Muir Patent Law, PLLC

(57) ABSTRACT

A method and system for verifying a layout of an integrated circuit (IC) is disclosed. The IC may include a plurality of strings each including a plurality of memory cells which are vertically stacked on a substrate. The method may include receiving schematic data of the IC including instances of a string symbol and layout data, preparing a layout versus schematic (LVS) rule file in which a string device is defined, and performing LVS verification.

20 Claims, 16 Drawing Sheets

FIG. 8

```
       ┌ SSLT = (NOT SSL P) NOT WL_CUT
       │ STR = P AND SSL AND WL8 AND ... AND WL1 AND GSL CSL
SEC1 ⎨                    ⋮
       │
       └
       ┌ DEVICE STR(NS_SYM) P(P_BL) SSLT(P_SSL) WL8(P_WL8)...
SEC2 ⎨          WL1(P_WL1) GSL(P_GSL) CSL(P_CSL) [0]
       └
```

30a_1

```
SSL = (NOT SSL P) NOT WL_CUT
STR = P AND SSL AND WL8 AND ... AND WL1 AND GSL CSL
STR_INNER = STR AND IN_BOUND
STR_OUTER = STR NOT IN_BOUND
        :
DEVICE STR(NS) P(P_BL) ... CSL(P_CSL)
```

METHOD AND SYSTEM FOR VERIFYING LAYOUT OF INTEGRATED CIRCUIT INCLUDING VERTICAL MEMORY CELLS

CROSS-REFERENCE TO RELATED APPLICATION

This application claims the benefit of Korean Patent Application No. 10-2016-0026424, filed on Mar. 4, 2016, in the Korean Intellectual Property Office, the disclosure of which is incorporated herein in its entirety by reference.

BACKGROUND

1. Field

The present disclosure relates to verifying a layout of an integrated circuit (IC), and more particularly, to a method and system for verifying a layout of an IC including vertical memory cells.

2. Description of the Related Art

A designer may design an integrated circuit (IC) by preparing a schematic (or schematic data) of the IC so that the IC performs a desired function. The schematic of the IC may include various devices such as transistors, resistors, diodes, and the like, and define connectivity between the devices.

The designer may prepare layout data of the IC, which is implemented by stacking a plurality of layers on the basis of the schematic of the IC. The layout data of the IC may include topological data about the plurality of layers included in the IC, which is manufactured through semiconductor processes.

SUMMARY

The disclosed embodiments provide a method and system for verifying a layout of an IC including memory cells that are vertically stacked on a substrate.

According to an aspect of the inventive concept, there is provided a method of verifying a layout of an IC including a plurality of strings each including a plurality of memory cells which are vertically stacked on a substrate. The method includes receiving schematic data of the IC, in which the plurality of strings are respectively defined as a plurality of corresponding instances of a string symbol, each string symbol including a plurality of ports, receiving layout data of the IC, preparing a layout versus schematic (LVS) rule file in which a string device on the layout of the IC including a plurality of port layers corresponding to the plurality of ports is defined, and performing LVS verification on the IC by matching the string symbol to the string device on the basis of the schematic data, the layout data, and the LVS rule file.

According to another aspect of the inventive concept, there is provided a method of verifying a layout of an IC including a plurality of strings each including N memory cells which are vertically stacked on a substrate. The method includes receiving schematic data of the IC in which N memory cells are respectively defined as instances of different N cell symbols each including a plurality of ports, receiving layout data of the IC, preparing an LVS rule file in which different N cell devices disposed on the layout of the IC each include a plurality of port layers corresponding to the plurality of ports of each of the N cell symbol, and performing LVS verification on the IC by respectively matching the N memory cells to the N cell devices on the basis of the schematic data, the layout data, and the LVS rule file.

According to still another aspect of the inventive concept, there is provided a method of verifying a layout of an integrated circuit (IC) including a plurality of strings each including a plurality of memory cells which are vertically stacked on a substrate. The method includes representing each of the plurality of strings as an instance of a string symbol for a schematic, receiving layout data of the IC, the layout data including data indicating a plurality of strings, and performing LVS verification on the IC by matching the instances of the string symbols to the layout data.

According to still another aspect of the inventive concept, there is provided a computer readable storage medium for verifying a layout of an IC including a plurality of strings each including a plurality of memory cells which are vertically stacked on a substrate. The medium stores schematic data of the IC in which the plurality of strings are defined as instances of a string symbol including a plurality of ports, respectively, and/or an LVS rule file in which a string device on the layout of the IC including a plurality of port layers corresponding to a plurality of ports is defined.

According to yet another aspect of the inventive concept, there is provided a computer readable storage medium for verifying a layout of the IC including a plurality of strings each including N memory cells which are vertically stacked on a substrate. The medium stores schematic data of the IC in which the N memory cells are defined as instances of different N cell symbols each including a plurality of ports, respectively, and/or an LVS rule file in which different N cell devices on the layout of the IC each including a plurality of port layers corresponding to a plurality of ports of each of the N cell symbols are defined.

BRIEF DESCRIPTION OF THE DRAWINGS

Embodiments of the inventive concept will be more clearly understood from the following detailed description taken in conjunction with the accompanying drawings in which:

FIG. 8 is a view illustrating an example of a layout versus schematic (LVS) rule file of FIG. 5 according to an embodiment of the present disclosure;

DETAILED DESCRIPTION

Figure 1:
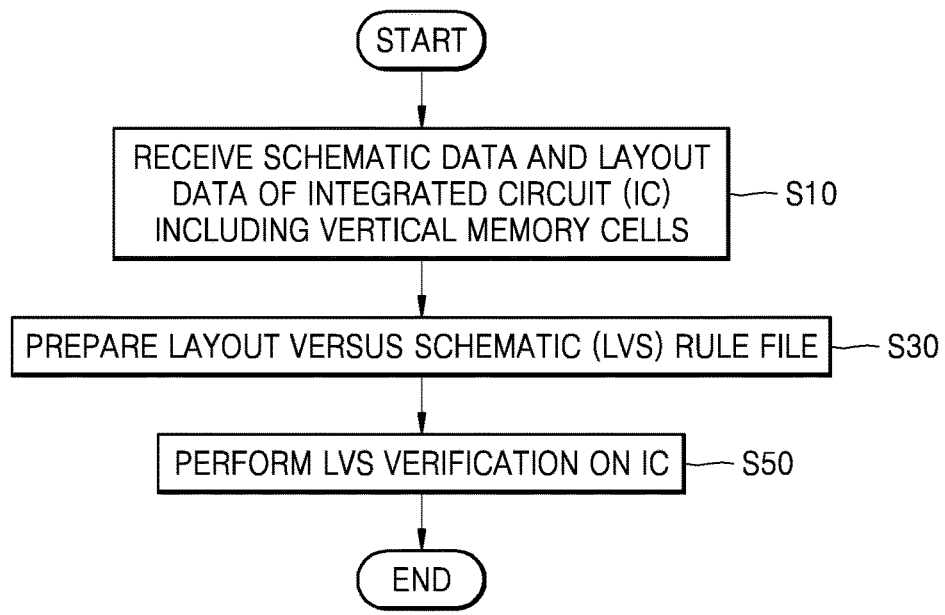
FIG. 1 is a flowchart illustrating a method of verifying an integrated circuit (IC) according to an embodiment of the present disclosure.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of layers and regions may be exaggerated for clarity. Like numbers refer to like elements throughout. Though the different figures show variations of exemplary embodiments, and may be referred to using language such as "in one embodiment," these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Also these spatially relative terms such as "above" and "below" as used herein have their ordinary broad meanings—for example element A can be above element B even if when looking down on the two elements there is no overlap between them (just as something in the sky is generally above something on the ground, even if it is not directly above).

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a flowchart illustrating a method of verifying an integrated circuit (IC) according to an embodiment of the present disclosure. Specifically, FIG. 1 is a flowchart illustrating an exemplary method of verifying whether layout data of the IC is functionally equivalent to schematic data of the IC.

The schematic (or schematic data) of the IC may include various devices such as transistors, resistors, diodes, and the like, and may define connectivity between the devices. An IC designer may design an IC that performs a desired function by preparing schematic data. In the schematic data, devices included in the IC may be defined as instances of corresponding symbols, and the instances may be connected to each other through wires, which may also be represented in the schematic data. A symbol may define devices which perform the same function, and each device such as an N-channel metal-oxide-semiconductor (NMOS) transistor, a P-channel MOS transistor, a diode, a resistor, and the like, may be defined as a unique symbol. The symbol may be defined in a symbol library, and the schematic data may define instances of the symbol by referring to the symbol library. The symbol may include one or more ports, and the port of the instance of the symbol may be connected to a port of an instance of a same or different symbol through a wire in the schematic data.

The layout data of the IC may be topological data about a layout of the IC, for example, data having a graphic database system (GDS) format. Through a semiconductor manufacturing process, the IC may have a structure in which a plurality of layers are stacked, and the layout data of the IC may include topological information on the plurality of layers. The plurality of layers may include a conductive layer, an insulating layer, and the like, and a device included in the IC may include a pattern formed on one or more layers.

Verifying whether an IC defined by schematic data is equivalent to an IC defined by layout data may be referred to as layout versus schematic (LVS) verification. That is, the LVS verification may verify whether the layout data of the IC is functionally equivalent to the schematic data of the IC. The LVS verification may be performed by an LVS verification tool, and the LVS verification tool may receive the schematic data of the IC and the layout data of the IC and perform the LVS verification by comparing the schematic data to the layout data. For example, the LVS verification tool may be a software module including a plurality of instructions executed by a processor, and may be stored in a computer readable storage medium, for example computer readable hardware. The LVS verification tool may determine if the IC represented in the schematic data has the same structure as the IC represented in the layout data. If so, the two ICs match, and can be verified. If not, the two ICs differ and one of them may be incorrect.

The LVS verification may include recognizing a device corresponding to an instance of a symbol defined in the schematic data from the layout data of the IC. In order to recognize the device from the layout data, the LVS verification tool may use an LVS rule file (or an LVS rule deck) in which a device is defined as a plurality of layers. The instance in the schematic data and the device in the layout data may have at least one property. For example, the property may include size information, arrangement information, and the like of the device. The LVS verification tool may verify whether the instance included in the schematic data is in the layout data and whether the instance of the schematic data and the device of the layout data, which correspond to each other, have the same property value.

Referring to FIG. 1, in operation S10, an operation of receiving schematic data and layout data of an IC including vertical memory cells may be performed. For example, a computer may receive the schematic and layout data from a user. The vertical memory cells may refer to a plurality of memory cells vertically stacked on a substrate. An IC such as a semiconductor memory device may include memory cells that may have different states according to data stored therein. In order to increase the storage capacity of the data, a plurality of memory cells may be vertically stacked on a substrate in the IC as described below with reference to FIGS. 3B and 13. A set of memory cells that are vertically stacked on the substrate may constitute a single string (e.g., NS11, etc. in FIG. 4), and the IC may include a plurality of strings. As described below with reference to FIGS. 3B and 4, each string may further include at least one auxiliary cell which supports operations for the memory cells, for example, writing, reading, erasing, and the like.

The LVS verification may be performed on a plan view of the layout of the IC. For example, the LVS verification may be performed on a plane perpendicular to a direction in which the layers in the IC are stacked. In the IC such as the semiconductor memory device in which the plurality of memory cells are vertically stacked on the substrate, the plurality of memory cells may be displayed on the plan view of the layout of the IC by overlapping with each other. Accordingly, the LVS verification of the IC including the vertical memory cells may not be easily performed.

In certain embodiments, in the schematic data of the IC received in operation S10, the plurality of strings of the IC may be defined as a single symbol, for example, instances of a string symbol. For example, in the schematic data of the IC, the memory cells and at least one auxiliary cell which are included in the string may be screened. Instead of individually verifying the memory cells and the auxiliary cell which are vertically stacked, the LVS verification may be performed in units of strings. Detailed content of these examples will be described with reference to FIGS. 5 to 10.

In certain embodiments, in the schematic data of the IC received in operation S10, the vertically stacked memory cells may be defined as instances of different symbols. For example, in the schematic data of the IC, the memory cells disposed at different levels (i.e., heights from the substrate) may be defined as instances of different symbols. When N memory cells (N is an integer greater than one) are stacked in a single string, the N memory cells may be respectively defined as N different symbols in the schematic data of the IC. In this case, ports of the N symbols may have different names from each other. Detailed content of this embodiment will be described with reference to FIGS. 11 and 12.

Referring to FIG. 1, in operation S30, an operation of preparing an LVS rule file may be performed. As described above, the LVS verification tool may receive the schematic data and the layout data of the IC and compare the schematic data to the layout data using the LVS rule file. The LVS rule file may include, for example, a series of codes written according to a standard verification rule format (SVRF) or tool command language (TCL) verification format (TVF). The LVS rule file may define the device in the layout of the IC, and allow the LVS verification tool to extract the device and connectivity between devices from the layout data of the IC.

The LVS rule file used in the LVS verification may vary according to the characteristic of the schematic data of the IC received in operation S10. For example, in the schematic data of the IC, when a single string is defined as an instance of the string symbol, the LVS rule file may define a string device to extract the string from the layout data of the IC. On the other hand, in the schematic data of the IC, when the memory cells disposed at different levels are respectively defined as instances of different symbols, the LVS rule file may define a plurality of memory cell devices to extract a device corresponding to each level from the layout data of the IC.

Referring to FIG. 1, in operation S50, the LVS verification of the IC may be performed. For example, the LVS verification tool may recognize and extract the device from the layout data of the IC and extract the connectivity between the devices on the basis of the LVS rule file. The LVS verification tool may generate a layout netlist based on information extracted from the layout data of the IC. Further, the LVS verification tool may generate a source netlist by compiling the schematic data of the IC. The LVS verification tool may generate LVS result data by comparing the layout netlist to the source netlist. The LVS result data may include information on whether the schematic data of the IC is equivalent to the layout data of the IC and information on an inconsistent portion. The designer may modify the schematic data of the IC or the layout data of the IC by referencing the LVS result data.

As described above, according to certain embodiments of the present disclosure, the layout of the IC including the vertical memory cells, for example, the memory cells which are vertically stacked on the substrate, may be verified. An existing LVS verification tool performed on a plan view of an IC is used, and thereby the layout of the vertical memory cells can be easily and accurately verified.

Figure 2:
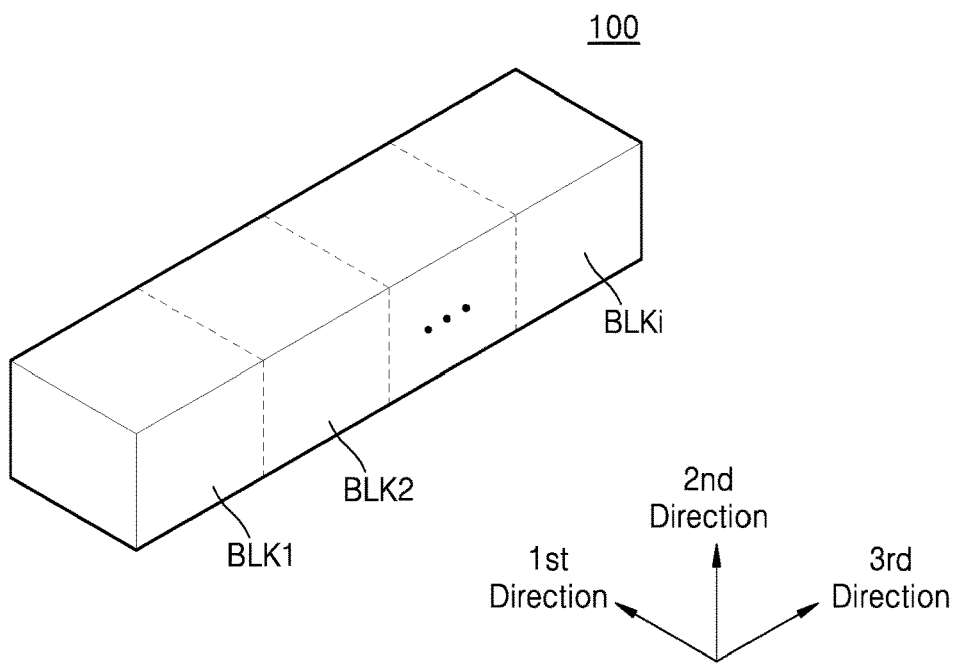
FIG. 2 is a view illustrating an example of a memory cell array included in an IC.

FIG. 2 is a view illustrating an example of a memory cell array 100 included in an IC. A plurality of memory cells included in the IC may constitute the memory cell array 100. Referring to FIG. 2, the memory cell array 100 may include a plurality of memory blocks BLK1 to BLKi.

Each of the plurality of memory blocks BLK1 to BLKi may have a three-dimensional (3D) structure (or a vertical structure). Specifically, each of the plurality of memory blocks BLK1 to BLKi may include structures extending along first to third directions. For example, each of the memory blocks may include a plurality of strings extending along the second (e.g., vertical) direction. In this case, the plurality of strings may be provided to be spaced a predetermined distance from each other along the first and third directions.

The plurality of memory blocks BLK1 to BLKi may be selected by a row decoder included in the IC. For example, the row decoder may select a memory block corresponding to a block address from the memory blocks BLK1 to BLKi. The memory blocks BLK1 to BLKi will be described in more detail with reference to FIGS. 3A and 3B.

Figure 3A:
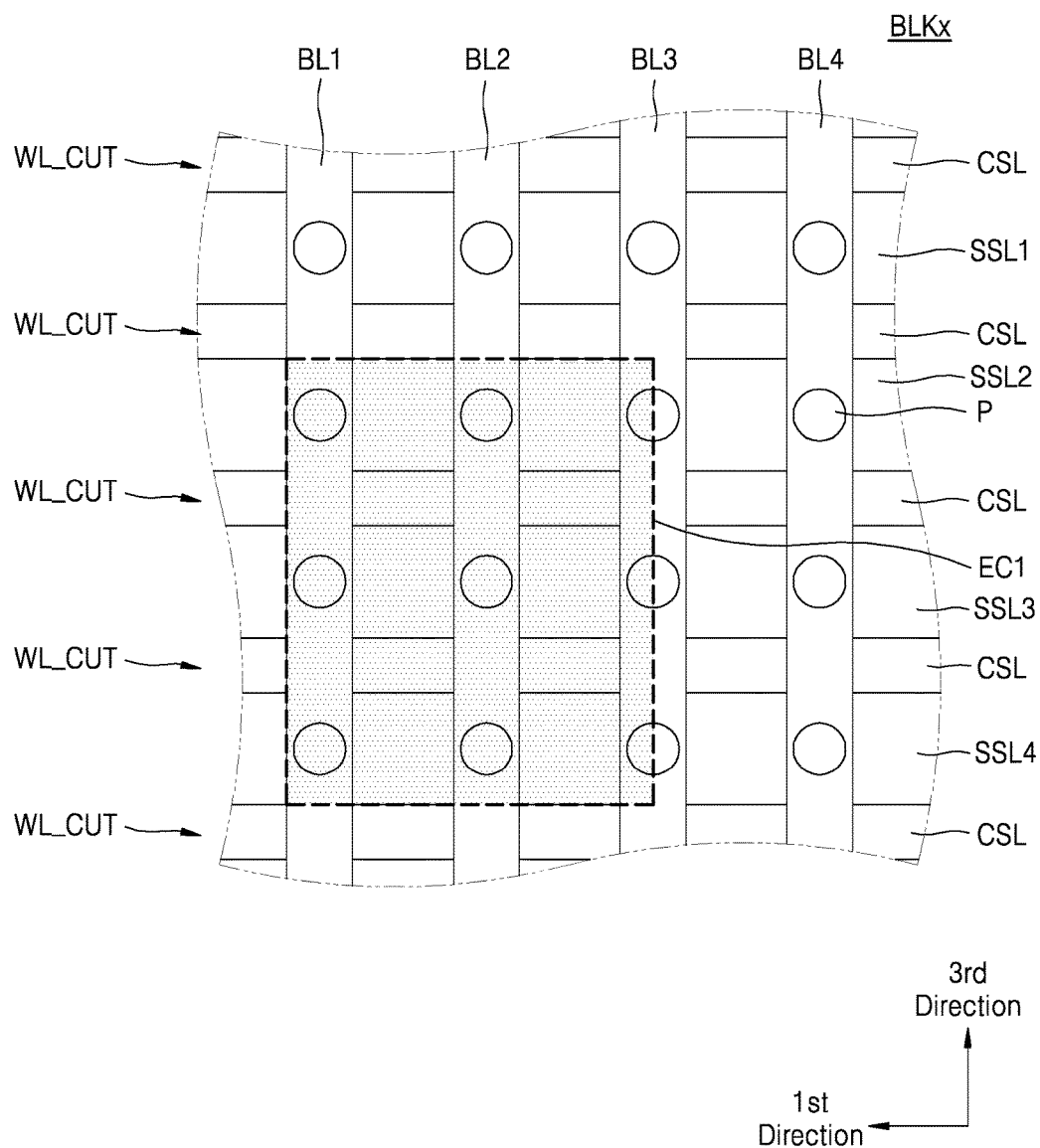
FIG. 3A is a plan view illustrating a portion of one memory block of memory blocks of FIG. 2 according to an embodiment of the present disclosure.
Figure 3B:
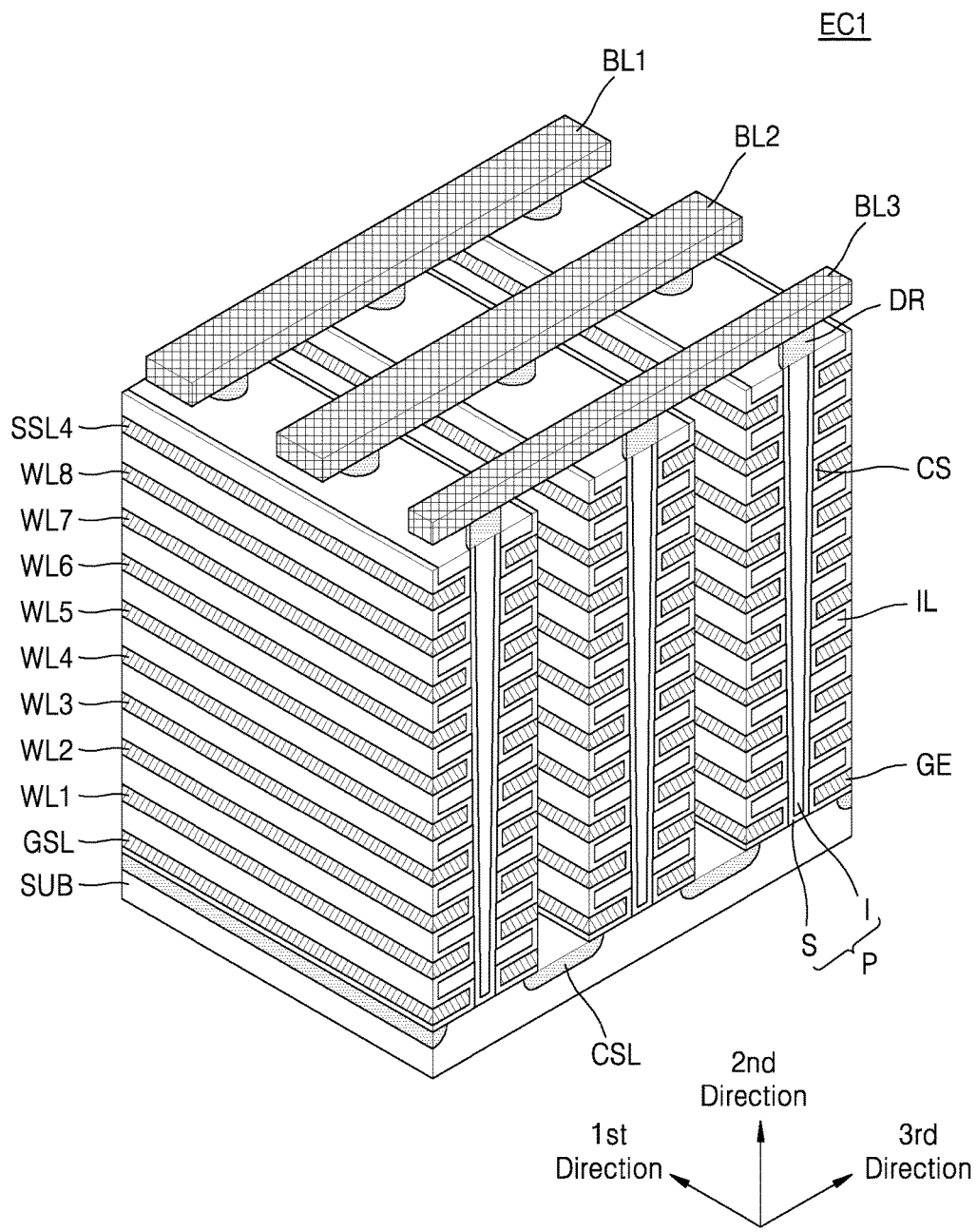
FIG. 3B is a perspective view illustrating a portion of the plan view of FIG. 3A.

FIG. 3A is a plan view illustrating a portion of one memory block BLKx, and FIG. 3B is a perspective view illustrating a portion EC1 of the plan view of FIG. 3A. Referring to FIGS. 3A and 3B, 3D structures extending along the first to third directions are provided.

The memory block BLKx may be formed in a direction perpendicular to a substrate SUB, for example, the second, vertical direction perpendicular to the first and third directions. Referring to the plan view of FIG. 3A, a plurality of bit lines BL1 to BL4 extending along the third direction and a plurality of string selection lines SSL1 to SSL4 extending along the first direction are arranged while crossing each other. In FIGS. 3A and 3B, although the string selection lines SSL1 to SSL4, 8 word lines WL1 to WL8, a ground selection line GSL, and the 4 bit lines BL1 to BL4 are illustrated to be respectively disposed at a plurality of levels in the second direction in the memory block BLKx, the number of components may be substantially greater than or smaller than that of these illustrated components.

The substrate SUB may have a first conductive type (e.g., a P type), and common source lines CSL, which extend along the first direction and are doped with impurities having a second conductive type (e.g., an N type), may be disposed on the substrate SUB. On an area of the substrate SUB between two adjacent common source lines CSL, a plurality of insulating layers IL extending along the first direction may be sequentially provided along the second direction, and the plurality of insulating layers IL may be spaced a predetermined distance from each other along the second direction. For example, the plurality of insulating layers IL may include an insulating material such as silicon oxide.

On the area of the substrate SUB between the two adjacent common source lines CSL, a plurality of pillars P, which are sequentially disposed along the first direction and pass through the plurality of insulating layers IL along the second direction, may be formed. For example, the plurality of pillars P may pass through the plurality of insulating layers IL to come into contact with the substrate SUB. Specifically, a surface layer S of each of the pillars P may include a silicon material having the second conductive type and may function as a channel area. Meanwhile, an inside I of each of the pillars P may include an insulating material such as silicon oxide or an air gap. It may be understood that the pillars P are illustrated on the plan view of FIG. 3 for a description of the example.

On the area between the two adjacent common source lines CSL, charge storage layers CS may be formed along exposed surfaces of the insulating layers IL, the pillars P, and the substrate SUB. For example, the charge storage layers CS may have an oxide-nitride-oxide (ONO) structure. Further, on the area between the two adjacent common source lines CSL, gate electrodes GE may be provided on exposed surfaces of the charge storage layers CS.

A conductive material may be formed on the exposed surfaces of the charge storage layers CS between the plurality of insulating layers IL, and the conductive material may be separated by word line cuts WL_CUT and thereby cell gate lines CGL extending along the first direction may be formed. For example, the word line cuts WL_CUT may include an insulating material or may be air gaps, and the cell gate lines CGL may include a metallic conductive material or a non-metallic conductive material such as polysilicon. The term "air" as discussed herein, may refer to atmospheric air, or other gases that may be present during the manufacturing process.

Drains DR may be respectively disposed on the plurality of pillars P. For example, the drains DR may include a silicon material doped with impurities having the second conductive type. The bit lines BL1 to BL4, which extend along the third direction and are disposed to be spaced a predetermined distance from each other along the first direction, may be disposed on the drains DR.

Figure 4:
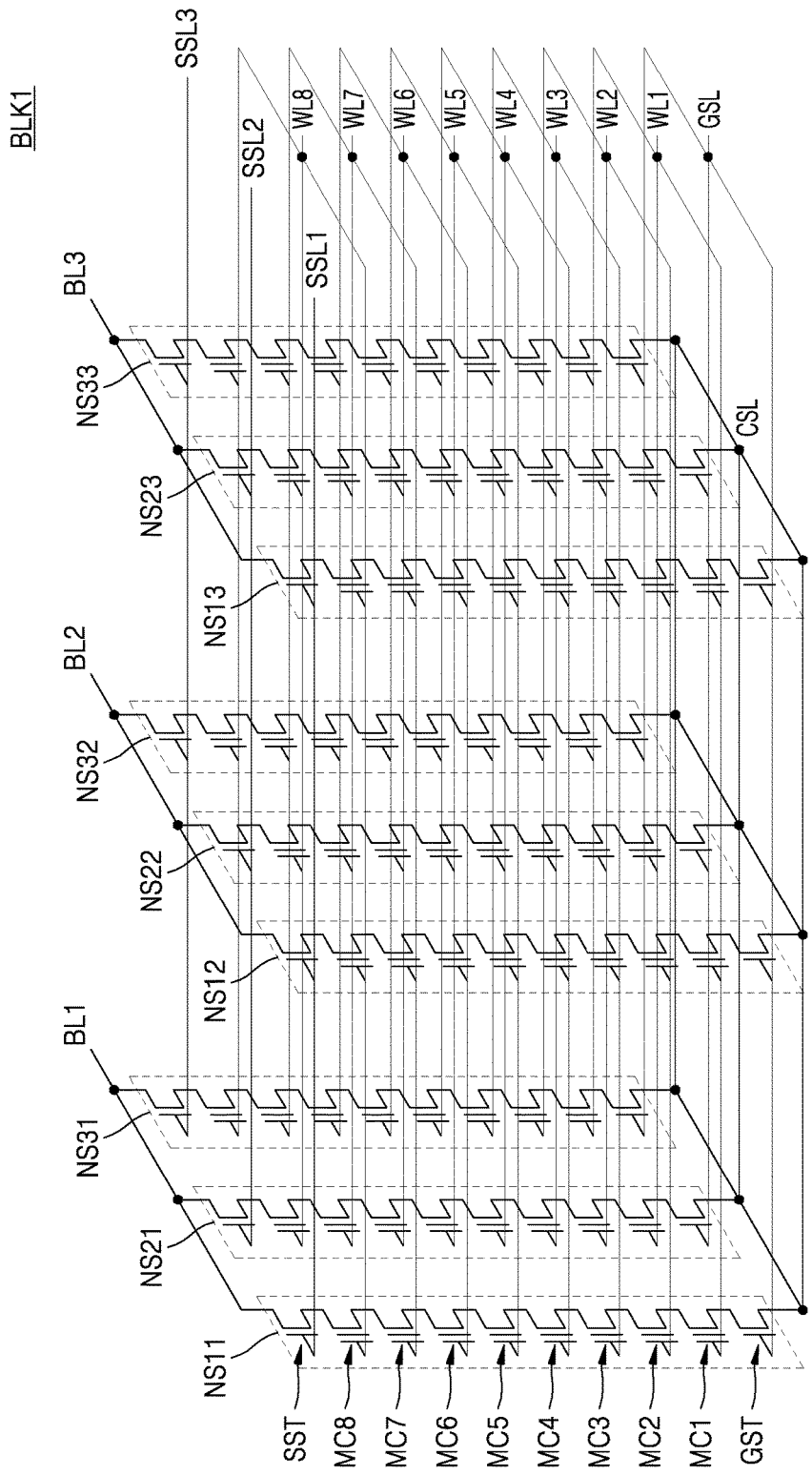
FIG. 4 is a circuit diagram illustrating an equivalent circuit of one memory block of the memory blocks of FIG. 2 according to an embodiment of the present disclosure.

FIG. 4 is a circuit diagram illustrating an equivalent circuit of one memory block BLK1 of the memory blocks BLK1 to BLKi of FIG. 2 according to an embodiment of the present disclosure. In the schematic of the IC, the memory block BLK1 may be defined as illustrated in the circuit diagram of FIG. 4.

Referring to FIG. 4, the memory block BLK1 may be an NAND flash memory having a vertical structure, and each of the memory blocks BLK1 to BLKi illustrated in FIG. 2 may be expressed as illustrated in FIG. 4. The string illustrated in FIG. 4 may include a string selection transistor SST, 8 memory cell transistors MC1 to MC8, and a ground selection transistor GST, but the present disclosure is not limited thereto.

Referring to FIG. 4, the memory block BLK1 may include a plurality of strings (e.g., NS11, NS12, NS13, etc.), and a plurality of bit lines BL1 to BL3, a plurality of string selection lines SSL1 to SSL3, a plurality of word lines WL1 to WL8, ground selection lines GSL, and a common source line CSL may be arranged in the memory block BLK1. The number of the strings, the number of the word lines, the number of the bit lines, the number of the ground selection lines, and the number of the string selection lines may be variously changed according to the embodiment.

Three strings may be provided between the common source line CSL and each of the bit lines BL1 to BL3. For example, a string NS11 may include a ground selection transistor GST, a plurality of memory cell transistors MC1 to MC8, and a string selection transistor SST, which are connected in series between the common source line CSL and the bit line BL1. The ground selection transistor GST and the string selection transistor SST may be referred to as auxiliary cell transistors and the string may be referred to as an NAND string.

Strings which are commonly connected to a single bit line may constitute a single column. For example, three strings NS11, NS21, and NS31 which are commonly connected to the first bit line BL1 may correspond to a first column, three strings NS12, NS22, and NS32 which are commonly connected to the second bit line BL2 may correspond to a second column, and three strings NS13, NS23, and NS33 which are commonly connected to the third bit line BL3 may correspond to a third column.

Strings which are connected to a single string selection line may constitute a single row. For example, the strings NS11, NS12, and NS13 which are connected to the string selection line SSL1 may correspond to a first row, the strings NS21, NS22, and NS23 which are connected to the string selection line SSL2 may correspond to a second row, and the strings NS31, NS32, and NS33 which are connected to the string selection line SSL3 may correspond to a third row.

The plurality of memory cell transistors MC1 to MC8 may be connected to the corresponding word lines WL1 to WL8, respectively. Specifically, gates of the plurality of memory cell transistors MC1 to MC8 may be connected to the corresponding word lines WL1 to WL8, respectively. Further, as illustrated in FIG. 4, the memory cell transistors which are disposed at the same vertical level (a height from the substrate) may be connected to the same word line. Accordingly, the gates of the memory cell transistors which are disposed at the same level may be configured to have the same potential.

The string selection transistors SSTs included in each of the strings may be connected to the string selection lines SSL1 to SSL3, respectively, and the ground selection transistors GST may be connected to the ground selection lines GSL. Further, a drain of each of the string selection transistors SST may be connected to the corresponding bit line BL, and a source of each of the ground selection transistors GST may be connected to the common source line CSL.

String selection transistors included in different strings may be configured to be controlled individually. That is, the three string selection lines SSL1 to SSL3 connected to the gates of the string selection transistors may be insulated from each other, and may individually receive signals. In this way, the plurality of strings which are commonly connected to a single string selection line of the plurality of string selection lines SSL1 to SSL3 or the cell transistors included in the strings may be referred to as a plane. For example, in FIG. 4, the strings NS11, NS12, and NS13 which are commonly connected to the string selection line SSL1 may be referred to as being included in the same plane.

Memory cell transistors to be accessed may be selected by selecting one from the plurality of string selection lines SSL1 to SSL3 and selecting one from the plurality of word lines WL1 to WL8. For example, when a selection voltage V_ON is applied to the string selection line SSL1 and a read voltage is applied to the third word line WL3, memory cell transistors which are included in the strings in the first row and connected to the third word line WL3 may be accessed.

In the example illustrated in FIG. 4, the string includes the string selection transistor SST and the ground selection transistor GST as auxiliary cell transistors, but the technological scope of the present disclosure is not limited thereto. For example, the string may further include at least one dummy cell transistor for protecting the memory cell transistors MC1 to MC8 between the plurality of memory cell transistors MC1 to MC8 and the ground selection transistor GST or between the plurality of memory cell transistors MC1 to MC8 and the string selection transistor SST.

Hereinafter, the IC is described to be the NAND flash memory having the vertical structure as described above with reference to FIGS. 2 to 4, but the technological scope of the present disclosure is not limited thereto. For example, the embodiments of the present disclosure may be applied to verify the layout of various types of ICs including the plurality of memory cells which are vertically stacked on a substrate.

Figure 5:
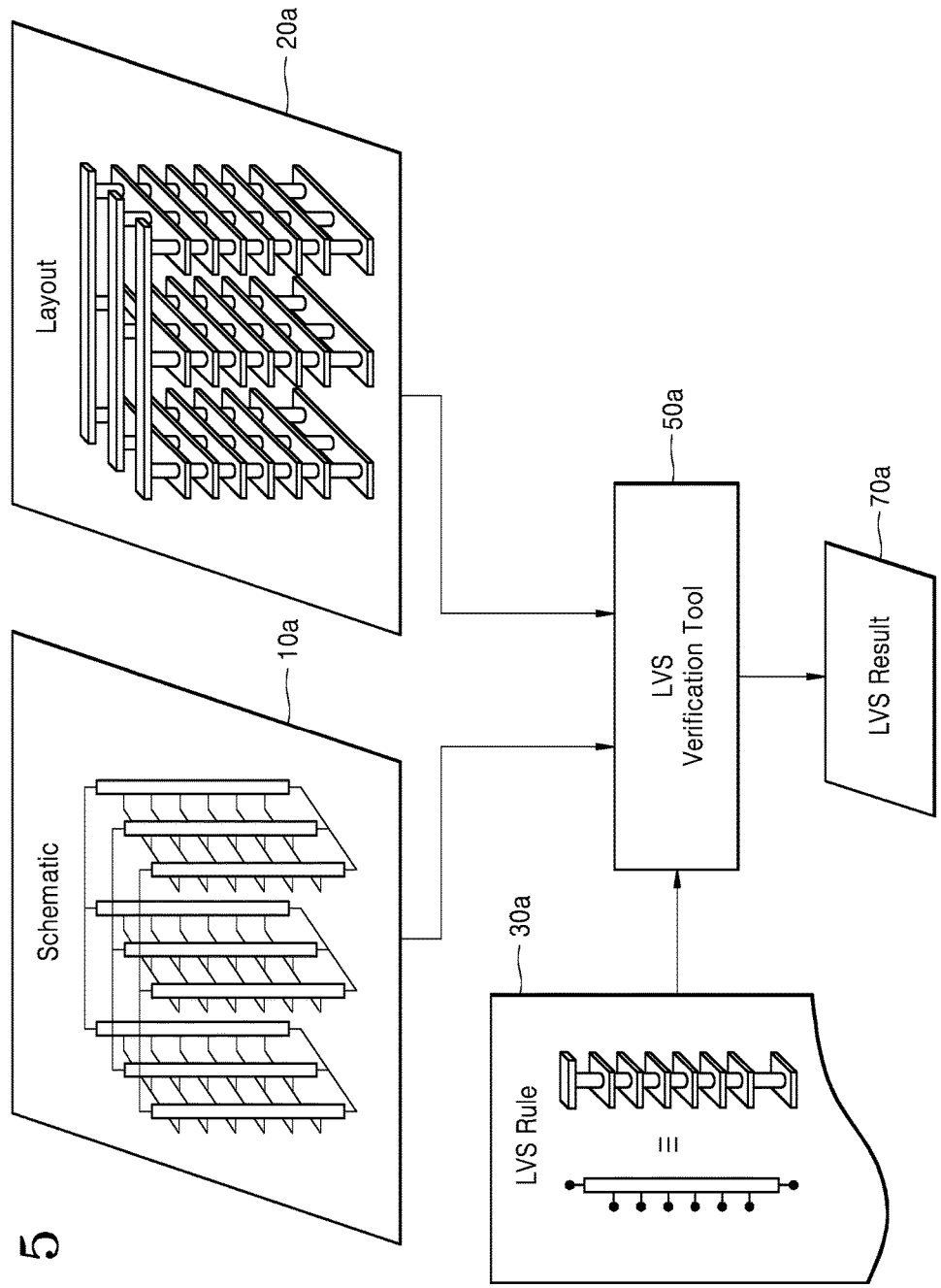
FIG. 5 is a diagram illustrating an embodiment in which a schematic of an IC in which a string of the IC is defined as an instance of a string symbol is used according to an embodiment of the present disclosure.

FIG. 5 is a diagram illustrating an embodiment in which a schematic of an IC, in which a string of the IC is defined as an instance of a string symbol, is used according to an embodiment of the present disclosure. Referring to FIG. 5, an LVS verification tool 50a may receive schematic data 10a and layout data 20a of the IC, and generate LVS result data 70a by referring to an LVS rule file 30a.

As described above with reference to FIG. 1, the layout of the IC may be verified in units of strings including a plurality of memory cells which are vertically stacked on a substrate. For example, as illustrated in FIG. 5, in the schematic data 10a of the IC, the IC may be defined as including a plurality of instances of the string symbol. Further, the schematic data 10a of the IC may define connectivity between the instances. As illustrated in FIG. 5, the layout data 20a of the IC may include topological data for defining a structure of an IC manufactured through a semiconductor manufacturing process.

The LVS rule file 30a may define a string device in the layout data 20a of the IC, which corresponds to the string symbol used in the schematic data 10a of the IC. As described below with reference to FIG. 8, the string device may be defined to include conductive layers corresponding to ports included in the string symbol, for example, port layers.

The LVS verification tool 50a may recognize and extract devices from the layout data 20a of the IC with reference to the LVS rule file 30a, and extract connectivity between the recognized devices. The LVS verification tool 50a may generate a layout netlist based on information extracted from the layout data 20a of the IC. Further, the LVS verification tool 50a may generate a source netlist by compiling the schematic data 10a of the IC. The LVS verification tool 50a may generate the LVS result data 70a by comparing the layout netlist to the source netlist.

Figure 6:
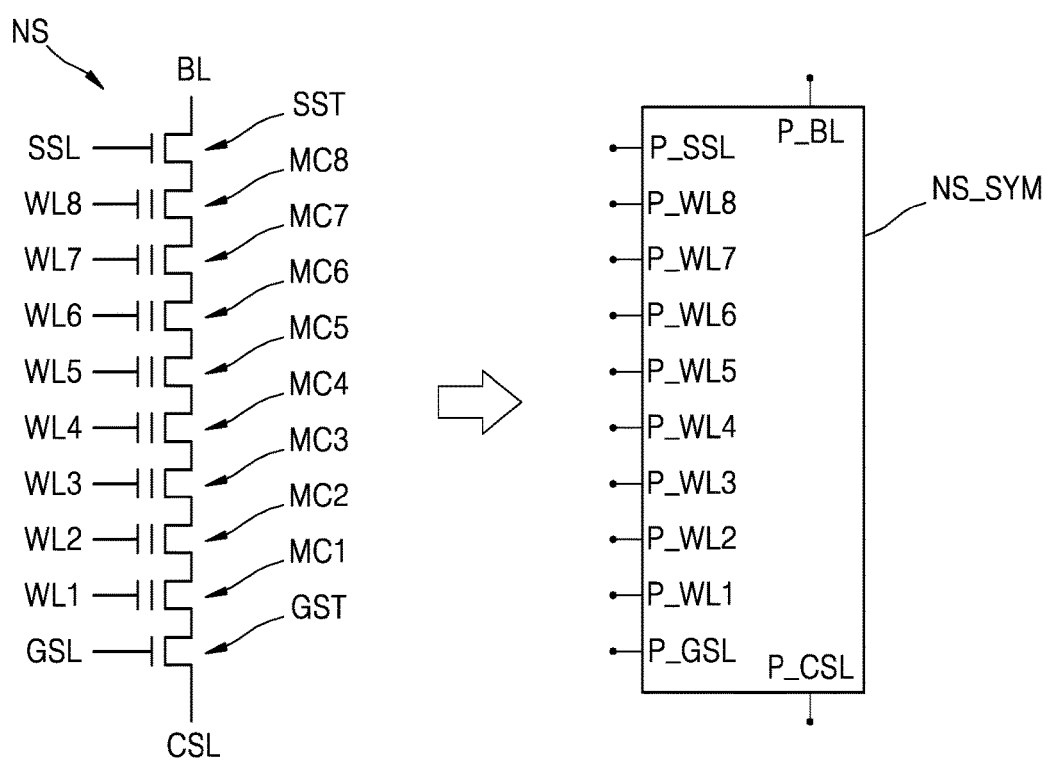
FIG. 6 is a view illustrating an example of the string symbol used in a schematic of FIG. 5 according to an embodiment of the present disclosure.
Figure 7:
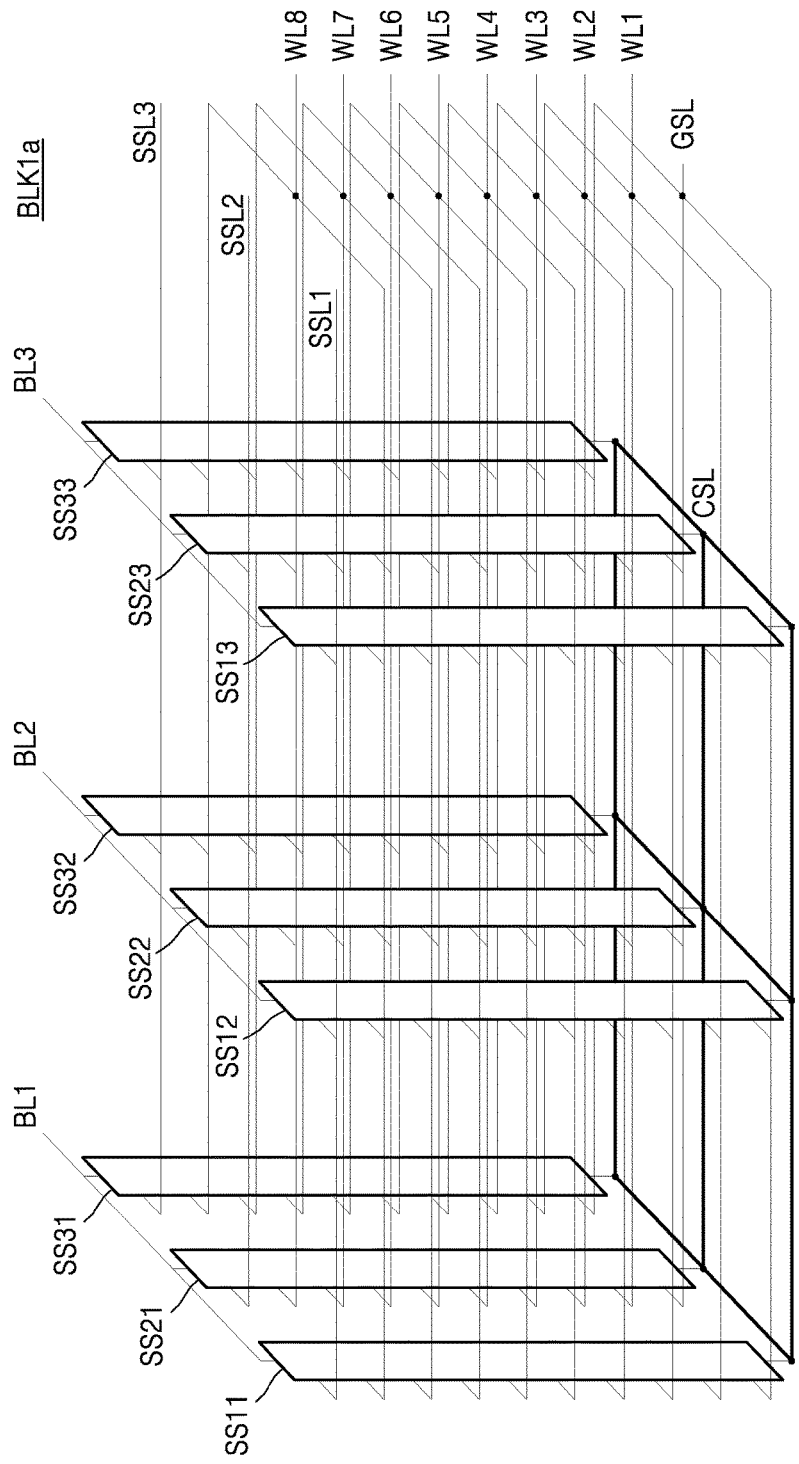
FIG. 7 is a circuit diagram of a memory block illustrated by using the string symbol of FIG. 6 according to an embodiment of the present disclosure.

FIG. 6 is a view illustrating an example of the string symbol used in the schematic data 10a of FIG. 5 according to certain embodiments of the present disclosure. FIG. 7 is a circuit diagram of a memory block BLK1a illustrated by using the string symbol of FIG. 6 according to certain embodiments of the present disclosure. As described above with reference to FIG. 5, in the schematic data 10a of the IC, the strings may be defined as the instances of the string symbol.

Referring to the left drawing of FIG. 6, a string NS may include a string selection transistor SST, a plurality of memory cell transistors MC1 to MC8, and a ground selection transistor GST, which are connected in series. In order to receive a selection signal or a non-selection signal, gates of the string selection transistor SST, the plurality of memory cell transistors MC1 to MC8, and the ground selection transistor GST may be connected to a string selection line SSL, a plurality of word lines WL1 to WL8, and a ground selection line GSL, respectively. Further, a drain of the string selection transistor SST may be connected to a bit line BL, and a source of the ground selection transistor GST may be connected to a common source line CSL.

Referring to the right drawing of FIG. 6, a string symbol NS_SYM corresponding to the string NS may be defined. The string symbol NS_SYM may include a plurality of ports, and the plurality of ports may correspond to paths through which signals which are input to the string NS or are output from the string NS pass. For example, the string symbol NS_SYM may include a port P_SSL to which the string selection line SSL is connected, ports P_WL1 to P_WL8 to which the plurality of word lines WL1 to WL8 are connected respectively, and a port P_GSL to which the ground selection line GSL is connected, as input ports. Further, the string symbol NS_SYM may further include a port P_BL to which the bit line BL is connected and a port P_CSL to which the common source line CSL is connected, as input and output ports.

Referring to FIG. 7, the memory block BLK1a may include a plurality of instances SS11 to SS13, SS21 to SS23, and SS31 to SS33 of the string symbol NS_SYM. Accordingly, compared to the configuration of the memory block BLK1 of FIG. 4, the connectivity, for example, bit lines BL1 to BL3, string selection lines SSL1 to SSL3, word lines WL1 to WL8, a ground selection line GSL, and a common source line CSL may connect ports of the plurality of instances SS11 to SS13, SS21 to SS23, and SS31 to SS33, and transistors SST, MC1 to MC8, and GST included in the string may be screened.

FIG. 8 is a view illustrating an example 30a_1 of the LVS rule file 30a of FIG. 5 according to an embodiment of the present disclosure. As described above with reference to FIG. 5, the LVS rule file 30a may define the string device in the layout data 20a of the IC, which corresponds to the string symbol used in the schematic data 10a of the IC. Names of layers used in FIG. 8 are the same as those used in FIGS. 3A and 3B, and FIG. 8 will be described with reference to FIGS. 3A and 3B.

Referring to FIG. 8, the LVS rule file 30a_1 may include a layer definition section SEC1 and a device definition section SEC2. The layer definition section SEC1 may define a layer which is used to define a device in the device definition section SEC2, that is, a derived layer, and may define layers included in the device. For example, as illustrated in FIG. 8, in a string device STR, a port layer SSLT which is connected to a string selection line SSL may be defined as "SSLT=(NOT SSL P) NOT WL_CUT." Further, the string device STR may be defined to include a plurality of conductive layers P, SSL, WL8 to WL1, GSL, and CSL.

The device definition section SEC2 may define a correspondence relationship between the string symbol NS_SYM used in the schematic data 10a of the IC and a device to be extracted from the layout data 20a of the IC. For example, as illustrated in FIG. 8, the string device STR may be defined as corresponding to the string symbol NS_SYM, and port layers P, SSLT, WL8 to WL1, GSL, and CSL of the string device STR may be defined as corresponding to ports P_BL, P_SSL, P_WL8 to P_WL1, P_GSL, and P_CSL of the string symbol NS_SYM. The LVS verification tool 50a may recognize and extract the device from the layout data 20a of the IC by interpreting the LVS rule file 30a_1 illustrated in FIG. 8.

According to some embodiments of the present disclosure, each of the string symbol NS_SYM and the string device STR may have a property indicating a size of a cross section of the string parallel to the substrate. Referring to FIG. 3A, a perimeter of the string may correspond to a width of a channel formed by the pillar and the word line. Therefore, the string symbol NS_SYM may have a perimeter of the pillar provided by the designer as a property, and the string device STR may also have the perimeter of the pillar expressed as "[0]" in FIG. 8 as a property. After the LVS verification tool 50a recognizes and extracts the string device STR from the layout data 20a of the IC, the LVS verification tool 50a may calculate the perimeter of the pillar as a property of the string device STR, and determine whether a value of the perimeter of the pillar is equivalent to that of a corresponding property of an instance of the string symbol NS_SYM. The property represents a physical characteristic, or physical parameter of the string device STR, such as an area, or circumference of the pillar.

Figure 9A:
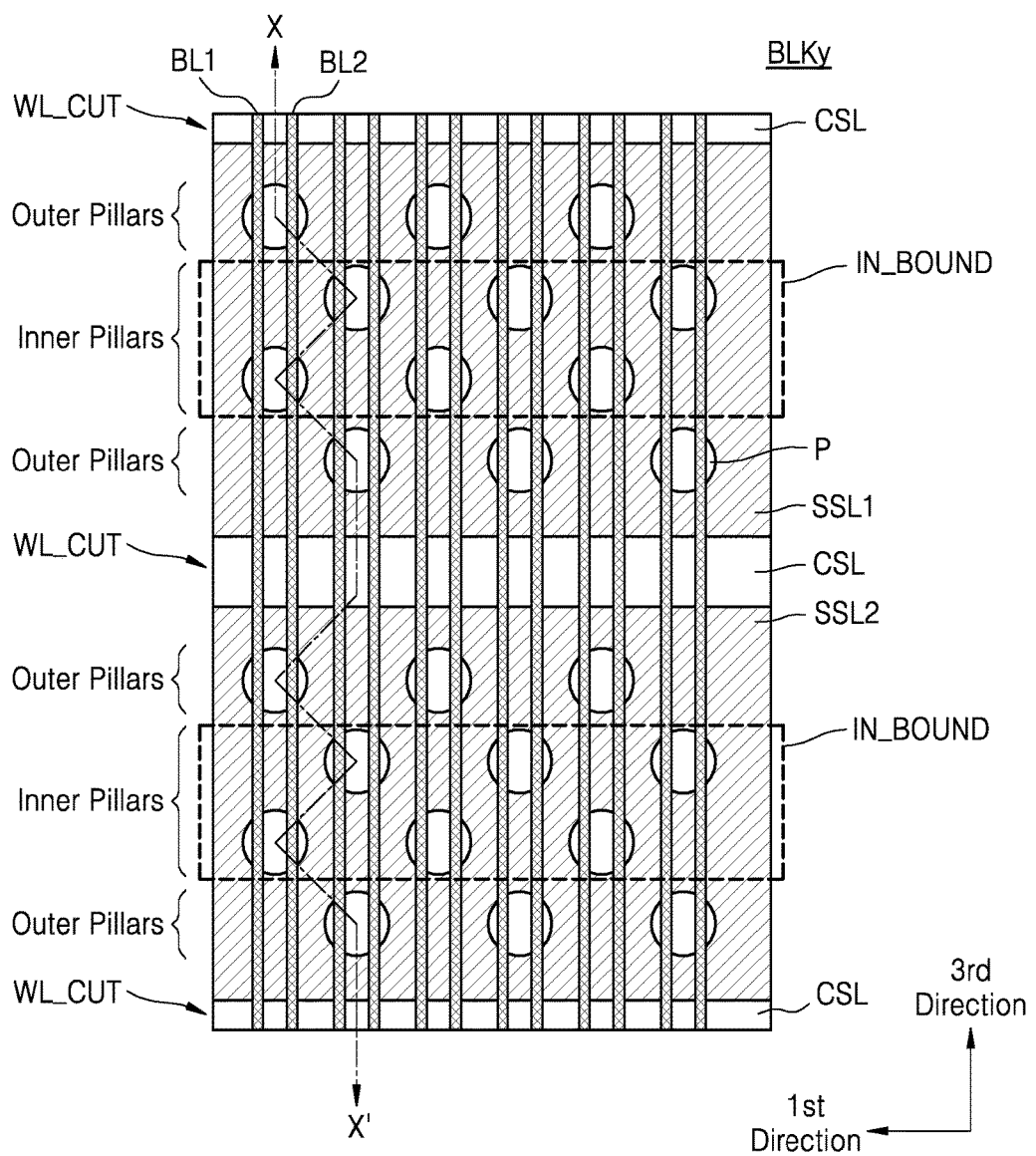
FIG. 9A is a plan view illustrating a portion of one memory block of the memory blocks of FIG. 2 according to an embodiment of the present disclosure.
Figures 9B, 10:
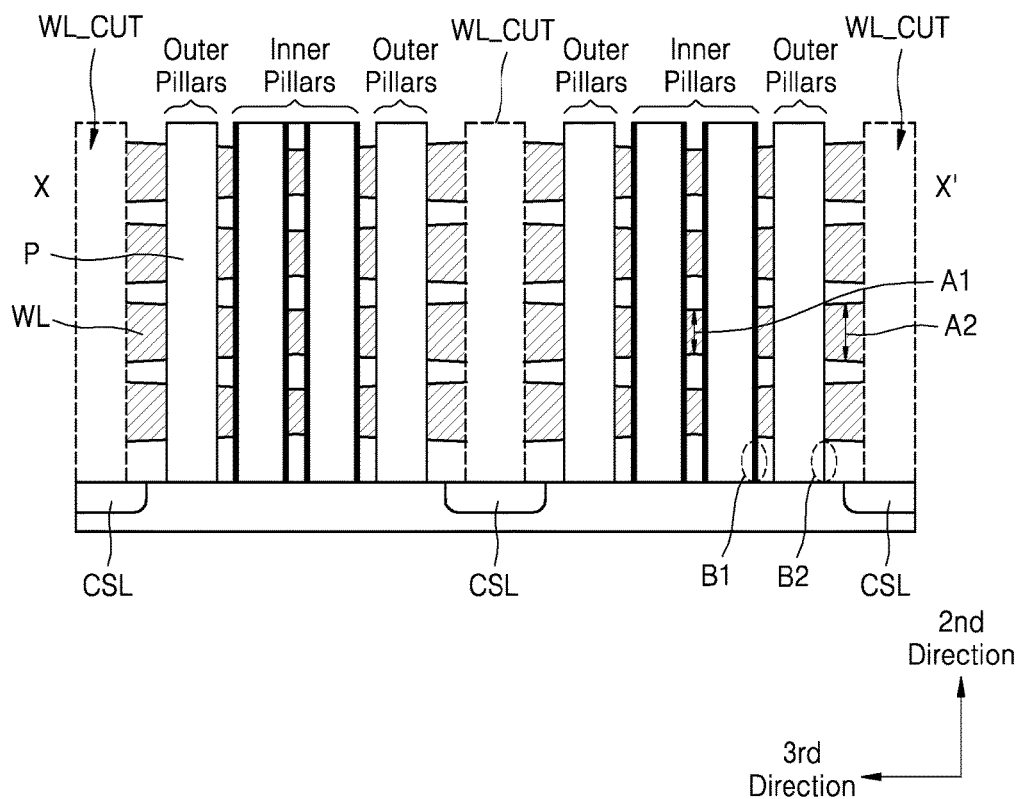
FIG. 9B is a cross-sectional view of a portion taken along line XX' in the plan view of FIG. 9A.
FIG. 10 is a view illustrating an example of the LVS rule file of FIG. 5 according to an embodiment of the present disclosure.

FIG. 9A is a plan view illustrating a portion of one memory block BLKy of the memory blocks BLK1 to BLKi of FIG. 2 according to an embodiment of the present disclosure, and FIG. 9B is a cross-sectional view of a portion taken along line XX' in the plan view of FIG. 9A. Compared to the structure of the memory block BLKx illustrated in FIGS. 3A and 3B, in the memory block BLKy illustrated in FIGS. 9A and 9B, strings connected to a single string selection line may be arranged in four rows.

Referring to FIG. 9A, in respective string selection lines SSL1 and SSL2 extending in a first direction, the strings may be arranged in four rows. Accordingly, the strings connected to a single string selection line may include outer strings, which are disposed adjacent to word line cuts WL_CUT and inner strings, which are disposed away from the word line cuts WL_CUT. For example, as illustrated in FIG. 9A, a plurality of pillars P connected to the first string selection line SSL1 may include outer pillars which are disposed adjacent to the word line cuts WL_CUT and inner pillars which are disposed away from the word line cuts WL_CUT.

Due to the semiconductor manufacturing process, the outer strings and the inner strings included in the memory block BLKy may have different characteristics. For example, as illustrated in FIG. 9B, a thickness A2 (a length in a second direction) of each of word lines WL in contact with the outer strings (or the outer pillars) may be greater than a thickness A1 of each of word lines WL in contact with the inner strings (or the inner pillars). In a process of manufacturing the memory block BLKy, the word lines WL may be formed by filling areas etched through the word line cuts WL_CUT with a conductive material (e.g., polysilicon or a metal). The areas etched by the word line cuts WL_CUT in the outer strings adjacent to the word line cuts WL_CUT may be greater than the areas in the inner strings, and thus the thicknesses of the word lines WL may be different.

Further, due to different etching degrees of the outer strings and the inner strings, thicknesses of a blocking oxide on surfaces of the pillars P may vary. For example, as illustrated in FIG. 9B, the thickness of the blocking oxide of each of the outer pillars at a point B2 may be smaller than the thickness of the blocking oxide of each of the inner pillars at a point B1.

FIG. 10 is a view illustrating an example 30a_2 of the LVS rule file 30a of FIG. 5 according to an embodiment of the present disclosure. As described above with reference to FIGS. 9A and 9B, in the layout of the IC, in order to verify strings having different characteristics according to a disposed position, the strings may be defined as different devices according to positions at which the strings are disposed in the LVS rule file. Hereinafter, FIG. 10 will be described with reference to FIGS. 9A and 9B.

Referring to FIG. 10, an inner string STR_INNER and an outer string STR_OUTER may be defined. The inner string STR_INNER may correspond to a string which is disposed relatively away from a word line cut WL_CUT, and the outer string STR_OUTER may correspond to a string which is disposed relatively close to the word line cut WL_CUT.

According to the embodiment of the present disclosure, the inner string STR_INNER and the outer string STR_OUTER may be defined using a virtual layer included in the layout data of the IC. For example, the layout data of the IC may include a virtual layer, "IN_BOUND," illustrated in FIG. 9A, and thus the inner string STR_INNER may be defined as "STR AND IN_BOUND" and the outer string STR_OUTER may be defined as "STR AND NOT IN_BOUND" as illustrated in FIG. 10.

Figure 11:
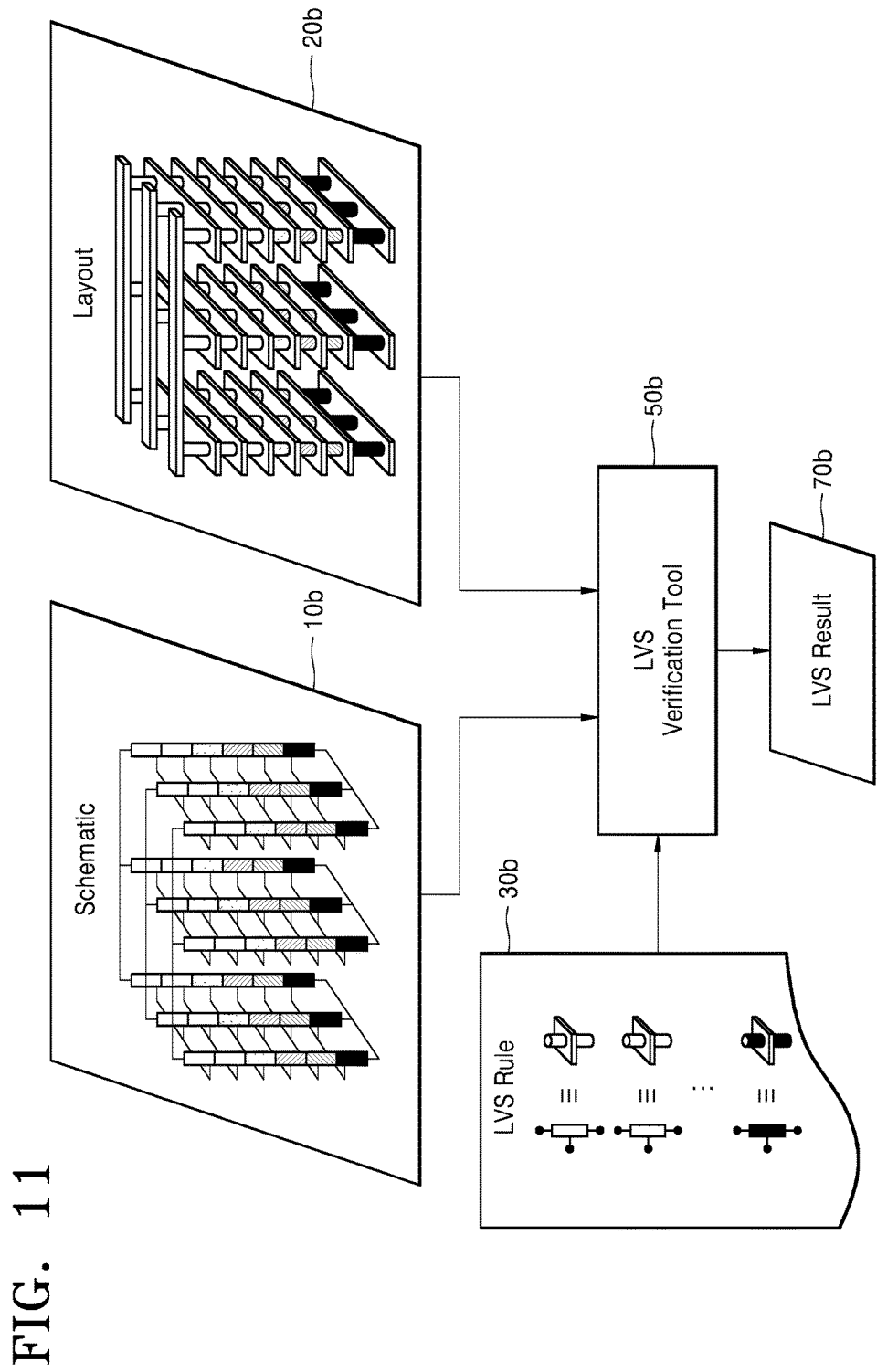
FIG. 11 is a diagram illustrating an embodiment in which a schematic of an IC in which vertically stacked memory cells are defined as instances of different symbols is used according to an embodiment of the present disclosure.

FIG. 11 is a diagram illustrating an embodiment in which a schematic of an IC, in which vertically stacked memory cells are defined as instances of different symbols, is used according to an embodiment of the present disclosure. Referring to FIG. 11, an LVS verification tool 50b may receive schematic data 10b and layout data 20b of the IC, and generate LVS result data 70b by referring to an LVS rule file 30b.

As described above with reference to FIG. 1, the layout of the IC may be verified by defining the plurality of memory cells which are vertically stacked on the substrate as instances of different symbols. For example, as illustrated in FIG. 11, in the schematic data 10b of the IC, a string of the IC may be defined as including instances of different cell symbols. That is, as illustrated in FIG. 11, a single string may be defined as including six instances of six different symbols. As illustrated in FIG. 11, the layout data 20b of the IC may include topological data for defining a structure of an IC manufactured through a semiconductor manufacturing process.

The LVS rule file 30b may define cell devices in the layout data 20b of the IC, which correspond to the cell symbols used in the schematic data 10b of the IC. For example, as illustrated in FIG. 8, the LVS rule file 30b may define six cell devices corresponding to the six cell symbols.

Similar to that described above with reference to FIG. 5, the LVS verification tool 50b may recognize and extract devices from the layout data 20b of the IC with reference to the LVS rule file 30b, and extract connectivity between the recognized devices. The LVS verification tool 50b may generate a layout netlist based on information extracted from the layout data 20b of the IC. Further, the LVS verification tool 50b may generate a source netlist by compiling the schematic data 10b of the IC. The LVS verification tool 50b may generate the LVS result data 70b by comparing the layout netlist to the source netlist.

Figure 12:
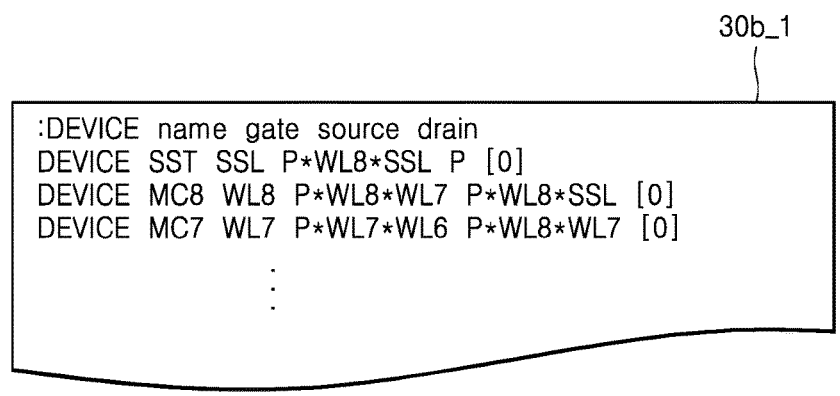
FIG. 12 is a view illustrating an example of an LVS rule file of FIG. 11 according to an embodiment of the present disclosure.

FIG. 12 is a view illustrating an example 30b_1 of the LVS rule file 30b of FIG. 11 according to an embodiment of the present disclosure. As described above with reference to FIG. 11, the LVS rule file 30b may define cell devices in the layout data 20b of the IC, which correspond to the cell symbols used in the schematic data 10b of the IC. Names of layers used in FIG. 12 are the same as those used in FIGS. 3A and 3B, and FIG. 12 will be described with reference to FIGS. 3A and 3B.

Referring to FIG. 12, the LVS rule file 30b_1 may define a plurality of different devices according to a disposed level. For example, as illustrated in FIG. 12, in a string selection transistor SST, a port layer of a gate may be defined as "SSL," a port layer of a source may be defined as "P*WL8*SSL," and a port layer of a drain may be defined as "P."

According to certain embodiments of the present disclosure, as illustrated in FIG. 6, in a structure in which a plurality of transistors are connected in series in a single string, port layers of a source and a drain of a transistor may be defined using a port layer corresponding to a gate of an adjacent transistor. Accordingly, overlapping transistors in a plan view of the IC may be normally verified. For example, as illustrated in FIG. 12, in an eighth memory cell transistor MC8 of which a gate is connected to an eighth word line WL8, a port layer of a source may be defined using a port layer, "WL7," of a gate of a seventh memory cell transistor MC7 disposed at a lower level than the eighth memory cell transistor MC8 by being defined as "P*WL8*WL7." Further, in the eighth memory cell transistor MC8, a port layer of a drain may be defined using a port layer, "SSL," of a gate of the string selection transistor SST disposed at an upper level than the eighth memory cell transistor MC8 by being defined as "P*WL8*SSL."

According to certain embodiments of the present disclosure, the cell symbols and the cell devices may have properties indicating sizes of a cross section thereof parallel to the substrate. As described above with reference to FIG. 8, since a width of the channel, which is formed by the pillar passing through the memory cell and the word line, may be related to a perimeter of the pillar, the cell symbols may have the perimeter of the pillar provided by the designer as a property, and each of the cell devices may also have the perimeter of the pillar expressed as "[0]" in FIG. 12 as a property. After the LVS verification tool 50b recognizes and extracts the cell device from the layout data 20b of the IC, the LVS verification tool 50b may calculate the perimeter of the pillar as a property, and determine whether a value of the perimeter of the pillar is equivalent to that of a corresponding property of an instance of the cell symbol.

Figure 13:
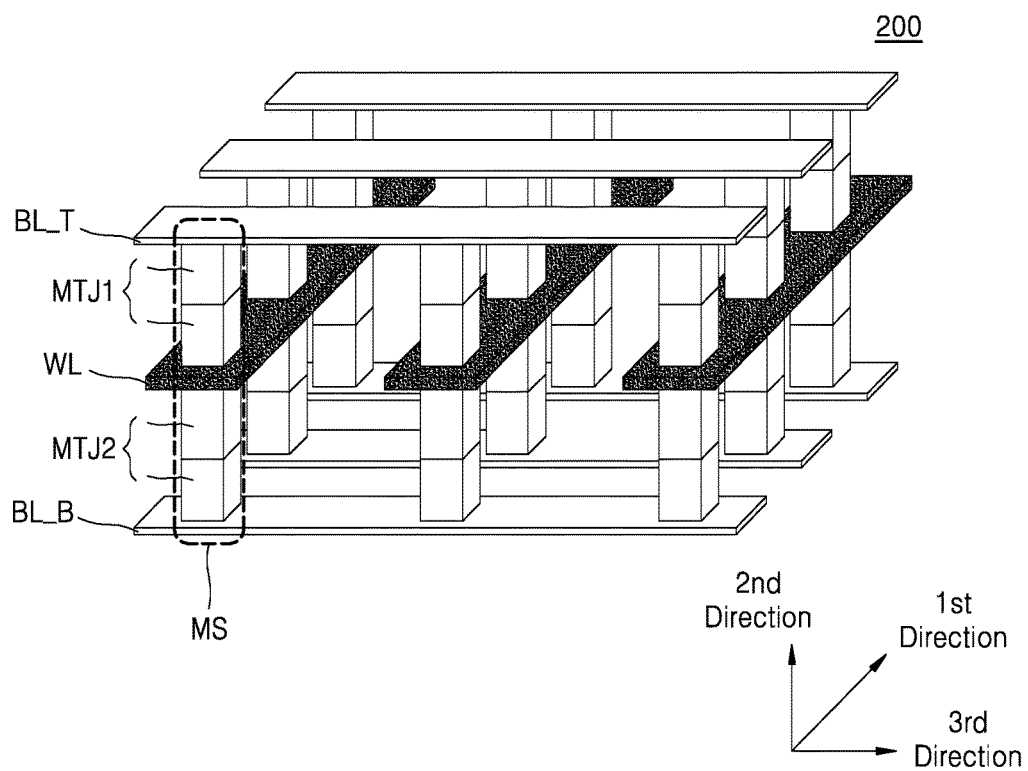
FIG. 13 is a view illustrating a structure of an IC including vertical memory cells according to an embodiment of the present disclosure.

FIG. 13 is a view illustrating a structure of an IC 200 including vertical memory cells according to an embodiment of the present disclosure. As described above, the embodiments of the present disclosure may be applied to the NAND flash memory having a vertical structure illustrated in FIG. 3B, etc., and to various ICs including vertical memory cells.

Referring to FIG. 13, the IC 200 may be a semiconductor memory device using a resistance change according to a polarity change of a magnetic body, for example, a magnetic random access memory (MRAM). A memory cell may include magnetic tunnel junction (MTJ) devices MTJ1 and MTJ2, and may be connected to bit lines BL_T or BL_B and a word line WL. In the MTJ devices MTJ1 and MTJ2, a resistance value may be changed according to a magnetization direction of a material constituting the MTJ, and the magnetization direction may be determined by a voltage difference between the bit lines (e.g., BL_T or WL).

As illustrated in FIG. 13, the MTJ devices MTJ1 and MTJ2 may be stacked in a direction (a second direction) perpendicular to a substrate, and the vertically stacked MTJ devices MTJ1 and MTJ2 may constitute a single string MS. According to some embodiments of the present disclosure, in schematic data of the IC 200, strings MS of the IC 200 may be defined as instances of string symbols, and LVS verification may be performed in units of strings. On the other hand, according to some embodiments of the present disclosure, in the schematic data of the IC 200, the vertically stacked MTJ devices MTJ1 and MTJ2 may be defined as instances of different cell symbols, and the LVS verification may be performed by comparing each of the MTJ devices MTJ1 and MTJ2 disposed at different levels to different cell devices.

Figure 14A:
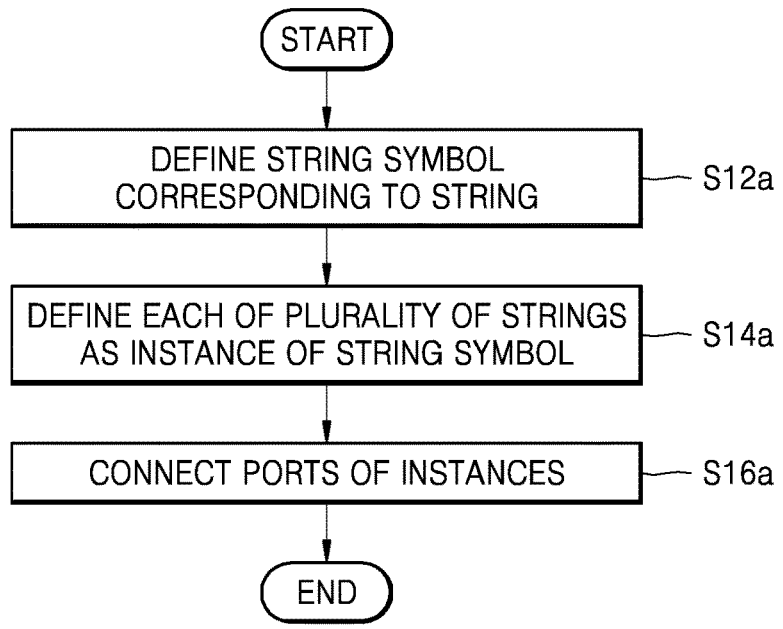
FIG. 14A is a flowchart illustrating a method of generating the schematic of FIG. 5 according to an embodiment of the present disclosure.
Figure 14B:
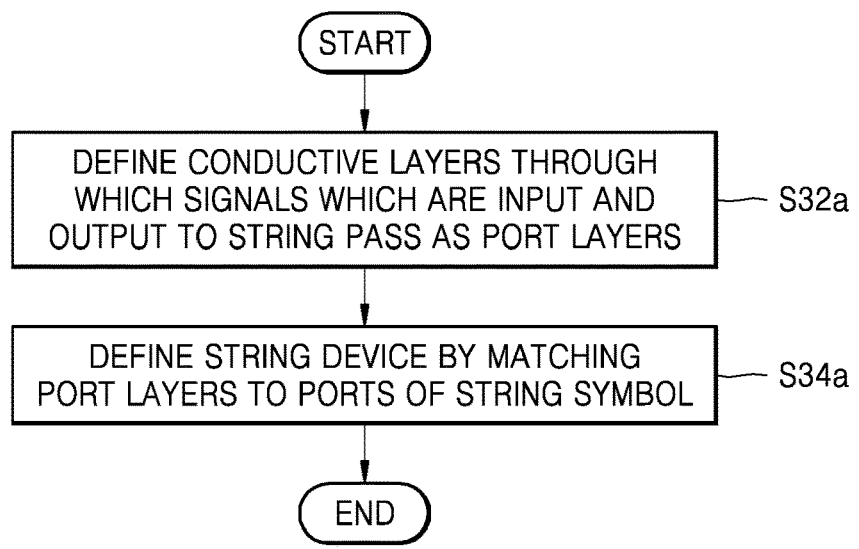
FIG. 14B is a flowchart illustrating a method of generating the LVS rule file of FIG. 5 according to an embodiment of the present disclosure.

FIG. 14A is a flowchart illustrating a method of generating the schematic data 10a of FIG. 5 according to an embodiment of the present disclosure, and FIG. 14B is a flowchart illustrating a method of generating the LVS rule file 30a of FIG. 5 according to an embodiment of the present disclosure. As described above with reference to FIG. 5, in the example of FIG. 5, the LVS verification may be performed in units of strings.

Referring to FIG. 14A, in operation S12a, an operation of defining a string symbol corresponding to a string may be performed. For example, as described above with reference to FIG. 6, the string symbol may include the memory cells and the auxiliary cell which are vertically stacked, and may include the ports through which signals which are input and output to the memory cells and the auxiliary cell pass. The string symbol may be defined in schematic data of an IC and in a symbol library referred to by the schematic data of the IC.

In operation S14a, an operation of defining each of a plurality of strings as an instance of the string symbol may be performed. Each of the strings included in the IC may be defined using the string symbol defined in operation S12a, and may be defined as an instance of the string symbol in the schematic data of the IC. Next, in operation S16a, an operation of connecting ports of the instances may be performed.

Referring to FIG. 14B, in operation S32a, an operation of defining conductive layers through which signals which are input and output to the string pass as port layers may be performed. The port layer, which is a layer corresponding to a port of the string symbol, may be a layer defined in advance in the layout data of the IC, and may be a derived layer re-defined from one or more defined layers. In operation S34a, an operation of defining a string device may be performed by matching the port layers to the ports of the string symbol. For example, as illustrated in FIG. 8, the string device may be defined in the LVS rule file by matching names of the ports of the string symbol to the port layers.

According to the embodiment of the present disclosure, operations S32a and S34a of FIG. 14B may be performed as portions of operation S30 of FIG. 1. For example, operation S30 of FIG. 1 may include operations S32a and S34a of FIG. 14B.

Figure 15A:
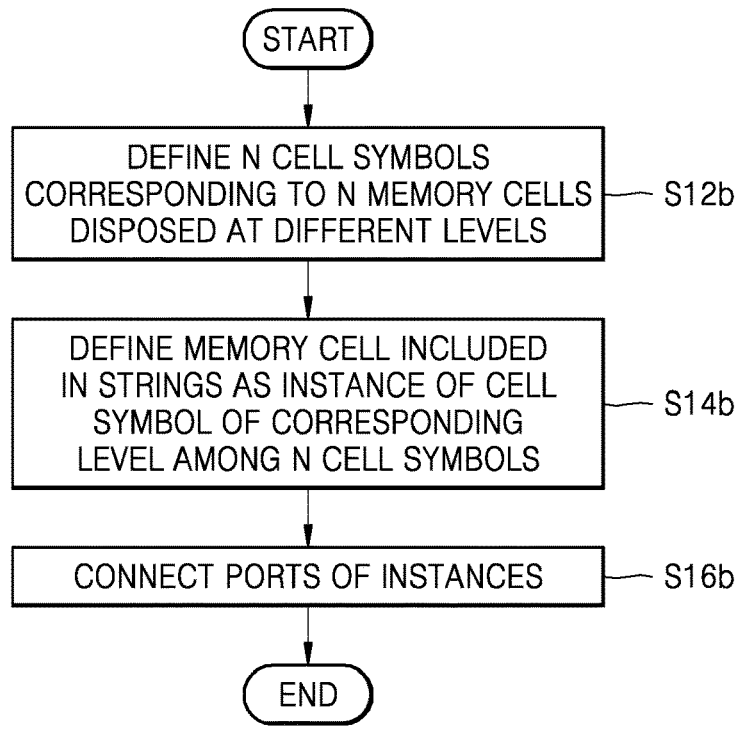
FIG. 15A is a flowchart illustrating a method of generating schematic of FIG. 11 according to an embodiment of the present disclosure.
Figure 15B:
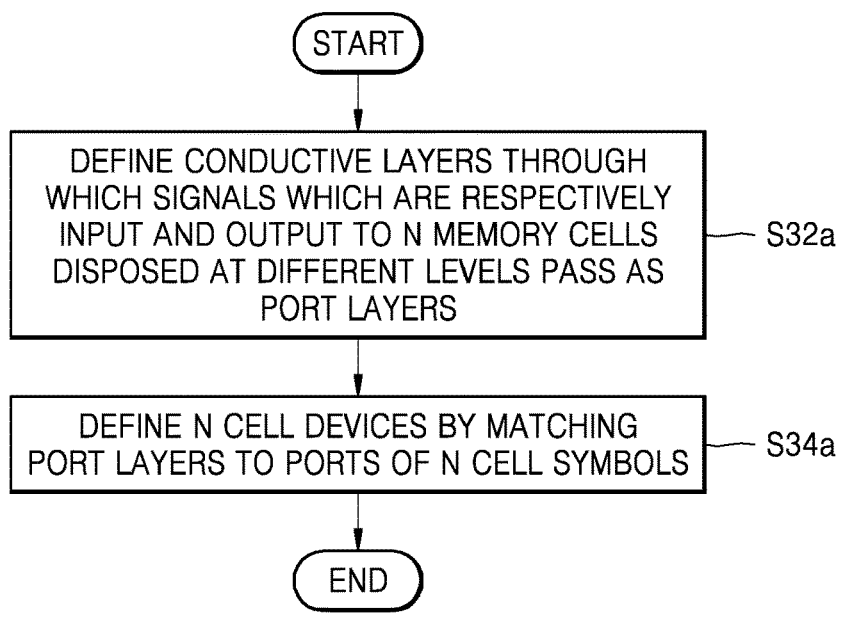
FIG. 15B is a flowchart illustrating a method of generating the LVS rule file of FIG. 11 according to an embodiment of the present disclosure.

FIG. 15A is a flowchart illustrating a method of generating the schematic data 10b of FIG. 11 according to an embodiment of the present disclosure, and FIG. 15B is a flowchart illustrating a method of generating the LVS rule file 30b of FIG. 11 according to an embodiment of the present disclosure. As described above with reference to FIG. 11, in the example of FIG. 1, the LVS verification may be performed using a plurality of cell symbols which are different according to disposed levels and cell devices.

Referring to FIG. 15A, in operation S12b, an operation of defining N cell symbols corresponding to N memory cells disposed at different levels may be performed. The cell symbols may be defined in schematic data of an IC and in a symbol library referred to by the schematic data of the IC.

In operation S14b, an operation of defining memory cells included in strings as an instance of the cell symbol disposed at a corresponding level of the N cell symbols may be performed. For example, as described above with reference to FIG. 11, a single string may be defined as including instances of different cell symbols, and a memory cell or an auxiliary cell, which is disposed at the same level, may be instances of the same cell symbol. Next, in operation S16b, an operation of connecting ports of the instances may be performed.

Referring to FIG. 15B, in operation S32b, an operation of defining conductive layers through which signals, which are input and output to each of the N memory cells disposed at different levels, pass as port layers may be performed. The port layer, which is a layer corresponding to a port of the cell symbol, may be a layer defined in advance in the layout data of the IC, and may be a derived layer re-defined from one or more defined layers. In operation S34b, an operation of defining N cell devices may be performed by matching the port layers to the ports of the N cell symbols. For example, as illustrated in FIG. 12, in the LVS rule file, the N cell devices may be defined by matching names of the ports of the cell symbols to the port layers of the cell devices.

According to some embodiments of the present disclosure, operations S32b and S34b of FIG. 15B may be performed as portions of operation S30 of FIG. 1. For example, operation S30 of FIG. 1 may include operations S32b and S34b of FIG. 15B.

Figure 16:
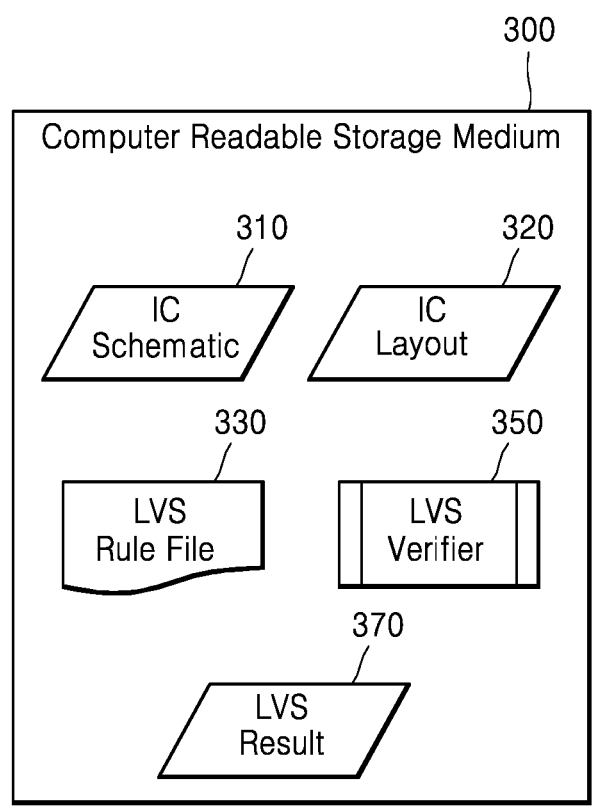
FIG. 16 is a block diagram illustrating a computer readable storage medium according to an embodiment of the present disclosure.

FIG. 16 is a block diagram illustrating a computer readable storage medium 300 according to an embodiment of the present disclosure. Referring to FIG. 16, the computer readable storage medium 300 may include IC schematic data 310, IC layout data 320, an LVS rule file 330, an LVS verifier 350, and LVS result data 370.

The computer readable storage medium 300 may include any storage medium that may be read by a computer while being used to provide instructions and/or data to the computer. For example, the computer readable storage medium 300 may include magnetic or optical hardware media such as a disc, a tape, a compact disc read-only memory (CD-ROM), a digital versatile disc ROM (DVD-ROM), a CD-recordable (CD-R), a CD-rewritable (CD-RW), a DVD-R, a DVD-RW, and the like, a volatile or nonvolatile memory such as a RAM, a read only memory (ROM), a flash memory, and the like, a nonvolatile memory that may be accessed through a Universal Serial Bus (USB) interface, microelectromechanical systems (MEMSs), and the like. The computer readable storage medium 300 may be inserted into the computer, integrated into the computer, and coupled to the computer through a communication medium such as a network and/or wireless link.

The IC schematic data 310 may be data which defines an IC including vertical memory cells. For example, the IC schematic data 310 may be data in which a plurality of strings are defined as instances of a string symbol as illustrated in FIG. 5, and data in which memory cells and an auxiliary cell which are disposed at different levels are defined as instances of different cell symbols as illustrated in FIG. 11.

The IC layout data 320 may include topological data for defining a structure of an IC manufactured through a semiconductor manufacturing process. For example, the IC layout data 320 may include topological data about a plurality of layers included in an IC.

The LVS rule file 330, which is referred to when the LVS verifier 350 performs LVS verification, may define a device to recognize and extract the device from the IC layout data 320. For example, the LVS rule file 330 may define a string device corresponding to a string symbol as illustrated in FIG. 5, and may define a plurality of cell devices respectively corresponding to memory cells disposed at different levels as illustrated in FIG. 11.

The LVS verifier 350 may generate the LVS result data 370 by comparing the IC schematic data 310 to the IC layout data 320 on the basis of the LVS rule file 330. The LVS verifier 350 may include a plurality of instructions for performing LVS verification, and a computing system or a processor included in the computing system may perform the LVS verification by executing the plurality of instructions included in the LVS verifier 350.

Figure 17:
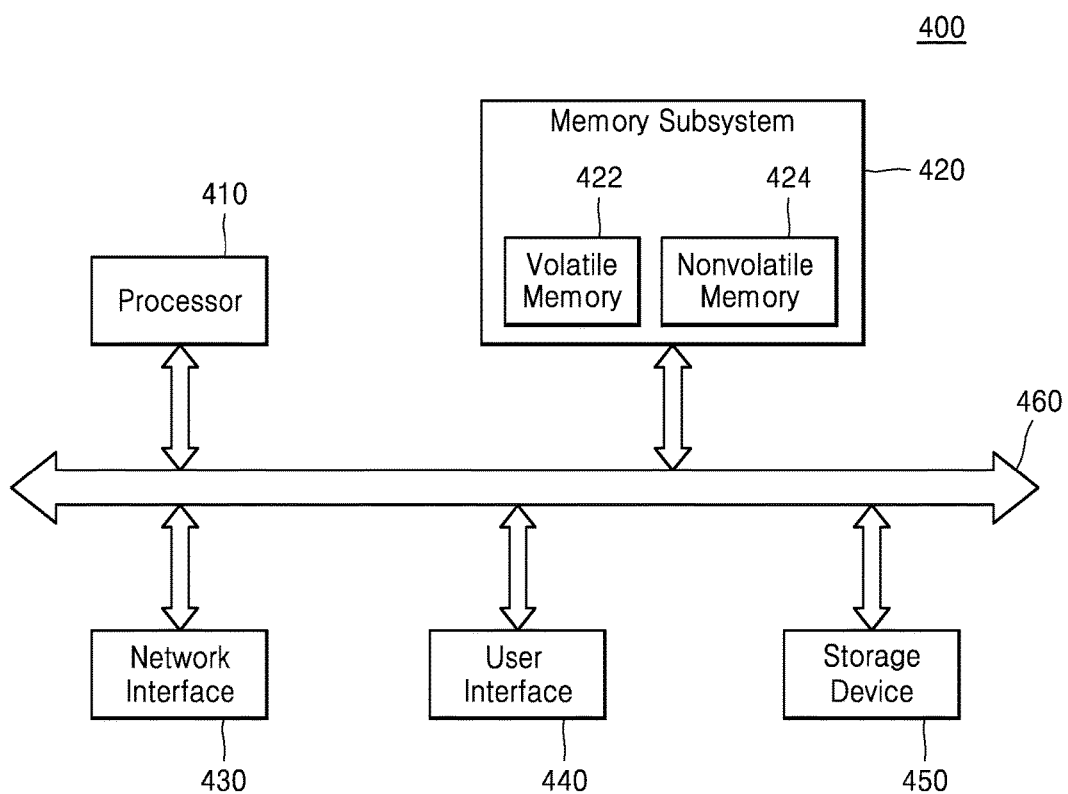
FIG. 17 is a block diagram illustrating a computing system according to an embodiment of the present disclosure.

FIG. 17 is a block diagram illustrating a computing system 400 according to an embodiment of the present disclosure. As illustrated in FIG. 17, the computing system 400 may include a processor 410, a memory subsystem 420, a network interface 430, a user interface 440, and a storage device 450, and the components may communicate with each other through a bus 460.

The processor 410 may be configured to execute instructions that perform one of the methods according to the above-described embodiments of the present disclosure. For example, the processor 410 may perform LVS verification in which schematic data of the IC is compared to layout data of the IC thereof with reference to an LVS verification file. Further, the processor 410 may generate schematic data of the IC and/or an LVS rule file to verify vertical memory cells. That is, some or all operations included in the flowcharts of the present disclosure may be performed by the processor 410. According to the embodiment of the present disclosure, the processor 410 may execute any instruction set (e.g., Intel Architecture (IA)-32, 64-bit extensions of IA-32, x86-64, PowerPC, Sparc, million instructions per second (MIPS), advanced reduced instruction set computer (RISC) Machine (ARM), IA-64, and the like). Further, the computing system 400 may include one or more processors.

The memory subsystem 420 may include a volatile memory 422 and a nonvolatile memory 424. Each of the volatile memory 422 and the nonvolatile memory 424 may include any type of memory device. For example, the volatile memory 422 may include a dynamic RAM (DRAM), a static RAM (SRAM), a mobile DRAM, a double data rate (DDR) synchronous DRAM (DDR SDRAM), a low power DDR (LPDDR) SDRAM, a graphic DDR (GDDR) SDRAM, a Rambus DRAM (RDRAM), and the like. Further, the nonvolatile memory 424 may include a nonvolatile memory such as an electrically erasable programmable ROM (EEPROM), a flash memory, a phase change RAM (PRAM), a resistance RAM (RRAM), a nano floating gate memory (NFGM), a polymer random access memory (PoRAM), an MRAM, a ferroelectric RAM (FRAM), and the like. Although not illustrated in the drawing, a memory controller may be included in the computing system 400 for an interface of the memory subsystem 420, and/or the processor 410 may include the memory controller.

The memory subsystem 420 may store data for performing at least a portion of the above-described method of verifying the layout of the IC and/or data processed by the processor 410, for example, schematic data of the IC, layout data of the IC, an LVS rule file, an LVS result data, and the like. Further, the nonvolatile memory 424 may store a plurality of instructions that allow the processor 410 to perform LVS verification, and thus the processor 410 may perform the methods according to the embodiments of the present disclosure.

The network interface 430 may provide an interface to an external network. For example, the external network may include a plurality of computing systems and communication links which are connected to each other and the communication links may include wired links, optical links, wireless links, or any other types of links.

The user interface 440 may provide an interface to a user. The user interface 440 may include an input device such as a keyboard, a point device, and the like, and may include an output device such as a display device, a printer, and the like. For example, the user may view and confirm the LVS result data through the user interface 440.

The storage device 450 may include a storage medium detachable from the computing system 400. For example, the storage device 450 may include the computer readable storage medium 300 illustrated in FIG. 16, and some pieces of data stored in the storage device 450, for example, design data of an IC and the like, may be transmitted to the memory subsystem 420 through the bus 460 while the computing system 400 operates. Further, data stored in the memory subsystem 420, for example, an LVS result data and the like, may be moved to the storage device 450 by the control of the processor 410, and the storage device 450 may store the received data.

In some embodiments, the computing system is used to verify that a schematic data matches layout data and present that verification to a user. Based on the verification, manufacturing steps for an integrated circuit are then carried out using one or both of the schematic data and the layout data. For example, the resulting layout data, including data for different vertical levels as discussed above, may be output to a manufacturing device or equipment, and may be executed by a manufacturing computer to control manufacturing equipment to perform various manufacturing steps of making masks, forming layers, etching layers, etc.

While the inventive concept has been particularly shown and described with reference to embodiments thereof, it will be understood that various changes in form and details may be made therein without departing from the spirit and scope of the following claims.

What is claimed is:

1. A method of manufacturing an integrated circuit (IC) including a plurality of strings each including a plurality of memory cells which are vertically stacked on a substrate, the method comprising:
receiving schematic data of the IC, in which the plurality of strings are respectively defined as a plurality of corresponding instances of a string symbol, each string symbol including a plurality of ports;
receiving layout data of the IC;
preparing a layout versus schematic (LVS) rule file in which a string device on the layout of the IC including a plurality of port layers corresponding to the plurality of ports is defined;
performing LVS verification on the IC by matching the string symbol to the string device on the basis of the schematic data, the layout data, and the LVS rule file; and
when the layout data matches the schematic data, manufacturing the IC based on the layout data.

2. The method of claim 1, wherein the plurality of ports of the string symbol have different names from each other.

3. The method of claim 1, wherein the plurality of port layers of the string device include a conductive layer corresponding to a word line or a bit line of the layout of the IC.

4. The method of claim 1, wherein:
each string further includes at least one auxiliary cell arranged with the plurality of memory cells and vertically stacked on the substrate; and
the plurality of port layers of the string device include at least one conductive layer electrically connected to a control input of the at least one auxiliary cell.

5. The method of claim 4, wherein:
each of the plurality of memory cells is a memory cell transistor having a threshold voltage corresponding to data to be stored;
the string includes a ground selection transistor connected to a common ground line, at least one dummy cell transistor, and a string selection transistor connected to a bit line as auxiliary cells; and
the ground selection transistor, the at least one dummy cell transistor, a plurality of memory cell transistors, and the string selection transistor are connected in series in a string.

6. The method of claim 5, wherein the plurality of ports include:
ports respectively connected to gates of the ground selection transistor, the at least one dummy cell transistor, the plurality of memory cell transistors, and the string selection transistor; and
ports respectively connected to the common ground line and the bit line.

7. The method of claim 1, wherein each of the string symbol and the string device has a size of a cross section of a string parallel to the substrate as a property.

8. The method of claim 1, wherein, in the LVS rule file, a first string device and a second string device are defined according to a distance between the string and a specific layer of the layout of the IC.

9. The method of claim 8, wherein the first and second string devices are defined on the basis of a virtual layer and the string device.

10. The method of claim 8, wherein the first string device corresponds to a string disposed to be spaced a first distance from a word line cut, and the second string device corresponds to a string disposed to be spaced a second distance from the word line cut.

11. The method of claim 1, wherein the preparing of the LVS rule file includes:
defining conductive layers through which signals which are input and output to the string pass as the plurality of port layers; and
defining the string device by matching the port layers to the ports of the string symbol.

12. A method of manufacturing an IC including a plurality of strings each including N memory cells which are vertically stacked on a substrate, the method comprising:
receiving schematic data of the IC in which N memory cells are respectively defined as instances of different N cell symbols each including a plurality of ports;
receiving layout data of the IC;
preparing an LVS rule file in which different N cell devices disposed on the layout of the IC each include a plurality of port layers corresponding to the plurality of ports of each of the N cell symbols;
performing LVS verification on the IC by respectively matching the N memory cells to the N cell devices on the basis of the schematic data, the layout data, and the LVS rule file; and
when the layout data matches the schematic data, manufacturing the IC based on the layout data.

13. The method of claim 12, wherein the plurality of ports of the N cell symbols have different names from each other.

14. The method of claim 12, wherein:
each of the N memory cells is a memory cell transistor having a threshold voltage corresponding to data to be stored; and
the N memory cell transistors are connected in series in a string.

15. The method of claim 14, wherein:
the N memory cell transistors include first to third memory cell transistors, which are sequentially connected in series, defined as different first to third cell symbols in the schematic data of the IC, and defined as first to third cell devices in a LVS rule file;
the first to third cell devices include first to third word line layers as port layers of gates of the first to third memory cell transistors, respectively; and
the second cell device includes a layer defined using the first and second word line layers as a port layer of a source of the second memory cell transistor, and includes a layer defined using the second and third word line layers as a port layer of a drain of the second memory cell transistor.

16. The method of claim 14, wherein the string further includes:
a string selection transistor disposed at a top of the string, connected to a bit line, defined as a first selection transistor symbol in the schematic data of the IC, and defined as a first selection transistor device in the LVS rule file; and
a ground selection transistor at a bottom of the string, connected to a common ground line, defined as a second selection transistor symbol in the schematic data of the IC, and defined as a second selection transistor device in the LVS rule file.

17. The method of claim 16, wherein:
the first selection transistor device includes a pillar passing through the string as a port layer of a drain of the string selection transistor; and
the second selection transistor device includes a layer defined using the pillar and the common ground line as a port layer of a source of the ground selection transistor.

18. The method of claim 12, wherein each of the N cell symbols and the N cell devices has a property indicating a size of a cross section of a memory cell parallel to the substrate.

19. The method of claim 12, wherein the preparing of the LVS rule file includes:
defining conductive layers through which signals which are input and output to each of the N memory cells disposed at different levels pass as port layers; and
defining the N cell devices by matching the port layers to the ports of the N cell symbols.

20. A method of manufacturing an integrated circuit (IC) including a plurality of strings each including a plurality of memory cells which are vertically stacked on a substrate, the method comprising:
representing each of the plurality of strings as an instance of a string symbol for a schematic;
receiving layout data of the IC, the layout data including data indicating a plurality of strings;
performing LVS verification on the IC by matching the instances of the string symbols to the layout data; and
when the layout data matches the schematic data, manufacturing the IC based on the layout data.

* * * * *